United States Patent Office 3,461,377
Patented Aug. 12, 1969

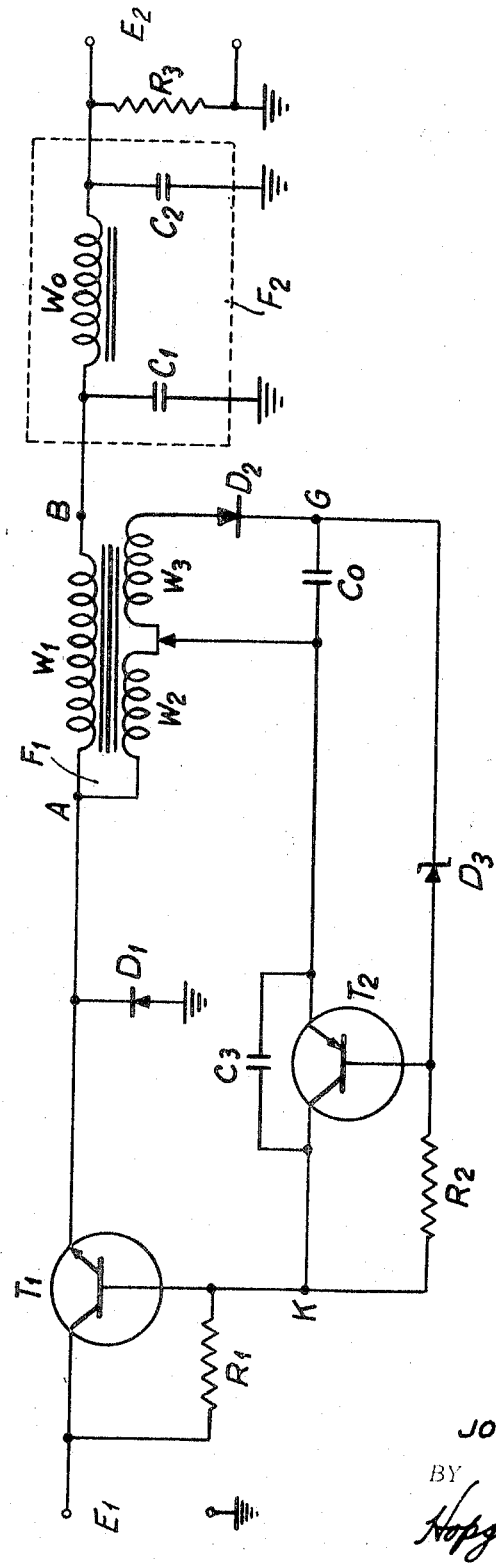

3,461,377
BLOCKING OSCILLATOR D.C. VOLTAGE REGULATOR
John S. Reese, St. Petersburg, Fla., assignor to Electronic Communications, Inc.
Filed Nov. 29, 1966, Ser. No. 597,616
Int. Cl. G05f 1/40
U.S. Cl. 323—22                                   7 Claims

ABSTRACT OF THE DISCLOSURE

A D.C. voltage regulator of the blocking oscillator type wherein a transistor is employed to supply current from a D.C. source in the form of pulses through a primary winding of a transformer to a load and wherein positive and negative feedback currents are derived from a pair of feedback windings magnetically coupled to the primary winding. A variable resistance device interconnects the feedback windings with the transistor to control the current thereof by varying the on time of the transistor with the device capable of responding to and regulating variations in the load and voltage fluctuations of the D.C. source.

---

This invention relates to voltage regulators, in general, and in particular, to a novel regulator responsive to both input and load fluctuations to vary the power, energy, and time relationships of a periodic signal to effect the regulation.

While there are various arrangements for regulating D.C. voltages, it is the object of this invention to provide an extremely efficient D.C. regulation with the fewest number of circuit components and greatest stability.

Briefly, the invention is predicated upon the concept of employing a blocking oscillator, the duty cycle of which may be controlled by varying the amount of base current furnished to a transistor switch. According to the invention, a D.C. feedback loop allows another transistor feeding the base of the switch to act as a variable resistor and vary the base drive, thereby controlling the output voltage. For variations in input voltage, regulation is achieved by varying the duty cycle. When the load is varied, the frequency of operation is altered as will be explained such that regulation is achieved.

The above mentioned and other features and objects of this invention and the manner of attaining them will become more apparent and the invention itself will best be understood by reference to the following description of an embodyment of the invention taken in conjunction with the accompanying drawing wherein the single figure schematically illustrates an embodiment of the present invention.

Referring now to the drawing, the invention will first be functionally described with a detailed analysis of the circuit components and their interrelationship following. The input voltage $E_1$ is applied via a switch (transistor $T_1$) to transformer winding $W_1$ having a finite inductance. From the usual $L Di/dt$ considerations, it will be apparent that the current varies linearly as a function of time. That is, there is a uniformly rising or ramp current function. This change in current in turn induces a voltage on windings $W_2$ and $W_3$.

The collector current through transistor $T_1$ increases uniformly until it reaches a maximum value determined by the base drive current (passing through transistor $T_2$). At this time, the emitter collector voltage increases on transistor $T_1$ and the collector current no longer increases. This stabilization of current removes the feedback which the transformer has been supplying through transistor $T_2$, and the collector current is further weakened, transistor $T_1$ rapidly shutting off or blocking.

Once transistor $T_1$ shuts down, point A is clamped to ground through diode $D_1$ and inductor $W_1$ is forced to dissipate its energy. As soon as the inductance has given most of its energy up, the blocking voltage collapses and the transistor becomes conductive again, starting a new cycle. Thus, we have an output voltage which is effectively a function of the duty cycle (on time/on time+off time) of the blocking oscillator.

Transistor $T_2$ serves the function of a variable resistor in the base drive of transistor $T_1$. The current flowing through transistor $T_1$ is, as mentioned, a ramp function which is provided with a fixed amount of base drive for predetermined input voltage and a fixed load. By varying the base resistance and hence current, transistor $T_2$ controls the maximum collector current which transistor $T_1$ may achieve. The voltage appearing on winding $W_3$ acts via diode $D_2$ to establish a voltage reference point G. The potential of this reference point determines the current, and hence the effective resistance, in the collector-emitter path of transistor $T_2$.

As will be explained in greater detail, an increase in the input voltage $E_1$ increases the feedback voltage on winding $W_3$ thereby reverse biasing the transistor $T_2$ to a greater extent, materially increasing its resistance and decreasing the base drive of transistor $T_1$. Transistor $T_1$ is thereby turned off at a lower current value.

From the differential equation $E=Ldi/dt$ and solving for $dt$, the time $t$ must be shorter and hence the on time is reduced. The off time depends upon the length of time it takes the inductor ($W_1$) to discharge its stored energy. Since the on time has been shortened, it may be assumed that the amount of energy stored has been decreased and accordingly, the off time is also reduced. However, the percentage change in on and off time is not necessarily the same since the equation which relates them is non-linear. Thus, we have an altered duty cycle which effects the regulation. Needless to say, a reduced input voltage $E_1$ effects a result similar to that explained above, except opposite.

If the load were increased, the voltage at point B would attempt to decrease. The reverse bias afforded by winding $W_3$ is thereby reduced and transistor $T_2$ supplies more base drive to transistor $T_1$; transistor $T_1$ thus putting in more average current. Since in this case, the off time is fixed, but the on time varying, a change in frequency results.

Regardless, and in case either the input voltage or the load varies, the cicuit inherently responds to compensate in the duty cycle.

*Detailed explanation.*—The input voltage is shown applied to the collector electrode of an NPN switching transistor $T_1$. The collector electrode of transistor $T_1$ is connected to the base electrode of this transistor by a resistor $R_1$ for initial self starting purposes. The emitter of transistor $T_1$ is connected to the upper terminal of the output circuit over a path which includes the winding $W_1$ of transformer $F_1$, and the series winding $W_0$ of a low pass filter $F_2$. The transformer $F_1$ includes two secondary windings $W_2$ and $W_3$, both of which have a turn ratio depending upon desired circuit characteristics and the transistors employed. Filter $F_2$ is of any well known type for substantially suppressing ripple components.

Winding $W_2$ of transformer $F_1$ is connected in a circuit which includes the emitter and collector electrodes of a second transistor $T_2$ which is employed as a variable resistor. This circuit also includes the base and emitter electrodes of transistor $T_1$. Transistor $T_2$ is of the opposite type of transistor $T_1$, and in this case is PNP. The essential purpose of the circuit including winding $W_2$ is to control the base current and hence the switching action of transistor $T_1$.

The third winding $W_3$ of transformer $F_1$ is intended to provide a reference voltage at a point G in a feedback loop circuit which controls the resistance of the transistor $T_2$. The loop circuit of winding $W_3$ includes a standard diode $D_2$, terminal G, which is the point at which the reference voltage may be observed, another diode $D_3$, which is preferably a Zener diode, and the base and emitter electrodes of transistor $T_2$. The collector and base electrodes of transistor $T_2$ are connected to each other by a biasing resistor $R_2$. Terminal K, the terminal common to the collector of transistor $T_2$ and resistor $R_2$, is connected to the base electrode of transistor $T_1$ as shown. A capacitor $C_3$ bridges the collector and emitter electrodes of transistor $T_2$. This capacitor may serve as a speed up capacitor since, for all intents and purposes, it is a short for instantaneous transients. Terminal A, the terminal common to windings $W_1$ and $W_2$ of transformer $F_1$, is connected to ground through another standard diode $D_1$ which clamps this point to ground when $T_1$ is off. The output circuit is bridged by a load resistor $R_3$ whose impedance value is substantially dictated by the load requirements.

If the applied D.C. input voltage remains at its normal value, the transistor $T_1$ will be repeatedly switched on and off to produce current of a substantially triangular wave form with a peak value equal to twice the average output current.

The linearly changing current through transistor $T_1$ and in winding $W_1$ induces voltage square waves in windings $W_2$ and $W_3$. The voltage produced across winding $W_3$ will establish, at terminal G, a reference voltage as previously suggested. Further, the voltage produced across winding $W_3$ will transmit a current through the loop circuit which includes the base and emitter electrodes of transistor $T_2$. The diode $D_3$ will initially carry but small current. As the voltage at terminal G tends to increase, however, diode $D_3$ will reach breakdown and the current therethrough will then be materially increased. At this time, the resistance of transistor $T_2$ will be increased due to the increase in reverse bias. The transistor $T_2$ is thereby linearly variable in resistance in proportion to the current through the loop circuit of winding $W_3$.

At the same time that the voltage on winding $W_1$ is increasing (due to an increase in the voltage $E_1$), the winding $W_3$ will produce a voltage which will result in a reduction of current over the circuit of the emitter and collector electrodes of transistor $T_2$ and hence the base drive of transistor $T_1$. As mentioned, this base current determines the maximum collector current of $T_1$. Regardless of $E_1$, or the load, the energy stored in winding $W_1$ will be dissipated by a flow of current through diode $D_1$ when $T_1$ shuts down and when the blocking voltage disappears the cycle will repeat.

In general, therefore, as the input voltage $E_1$ rises, the voltage across winding $W_3$ will rise increasing the effective resistance of transistor $T_2$ and reducing the base current of transistor $T_1$ so that this transistor will be on for a smaller percentage of the time. Hence the average current through winding $W_1$ will be reduced to its required average value.

But when the input voltage $E_1$ falls, the average voltages across winding $W_3$ will be reduced. Transistor $T_2$ will exhibit a lower resistance than before, and the base current of transistor $T_1$ will be increased so that a higher average current can be supported. Therefore, the transisto $T_1$ will be on during a greater percentage of time. The average current through winding $W_1$ will be thus increased.

It will be apparent that variations in the supply voltage and load cause the regulator to change its duty cycle and frequency (switching rate) effectively controlling the voltage $E_2$ supplied to the output circuit as well as the average energy available.

In one embodiment constructed according to the figure the incoming voltage ($E_1$) was 27 volts and varied plus or minus 15%, while the output voltage ($E_2$) was 16 volts plus or minus ¼%. Transistor $T_1$ was of the 2N3419 type and transistor $T_2$ was of the 2N2907 type. Rectifiers $D_1$ and $D_2$ were of the UTR-01 type. The Zener diode $D_3$ had a 5.6 voltage reference. Condensers $C_4$ and $C_3$ had capacitance of 0.1 μf. Resistors $R_1$ and $R_3$ were 100K ohm and 70 ohm devices. The transformer F had 60 turns on winding $W_1$ and 20 turns on windings $W_2$ and $W_3$.

What is claimed is:

1. A D.C. regulator comprising an inductor coupled in series between the input and output of said regulator; means for discharging stored energy in said inductor; a current switch in series with said inductor for producing a linearly varying current, the maximum value of which depends upon a control current applied to said switch; a source of control current dependent upon said linear current; a voltage reference; resistance means in series between said control current source and said switch and responsive to variations in said voltage reference for varying its resistance; and means responsive to fluctuations in load or input voltage for varying said voltage reference dependent thereon.

2. The D.C. regulator claimed in claim 1 wherein said current switch comprises a transistor, said control current being applied to the base thereof; and wherein said fluctuation responsive means comprises a second transistor, the emitter collector thereof being connected in series with said base of said first transistor.

3. The regulator claimed in claim 2 further comprising a Zener diode in series between the base of said second transistor and said voltage reference.

4. A D.C. regulator comprising a transformer including a first winding of finite inductance coupled in series between the input and output of said regulator; means for discharging stored energy in said winding; a transistor having its emitter collector in series with said first winding for producing a linear current, the maximum value of which depends upon a base drive current applied to said transistor; a second winding magnetically coupled to said first winding for producing a voltage thereacross dependent upon current changes in said first winding, said second winding being effectively coupled in series with the base of said transistor for supplying of the base drive current thereof; a third winding magnetically coupled to said first winding for producing a voltage thereacross dependent upon the current through said first winding; means for deriving a voltage reference from said third winding; variable resistance means connected in series between said second winding and the base of said transistor and responsive to variations in said voltage reference for varying the resistance thereof and thereby the base current to said first transistor.

5. In a D.C. voltage regulator of the type having a blocking oscillator switching means including an inductor in series with the load and a feedback winding magnetically coupled to said inductor for supplying the driving current to said oscillator switching element; the improvement comprising a further winding magnetically coupled to said inductor; means coupled to said further winding for producing a D.C. reference voltage; a transistor having its collector emitter circuit in series with said feedback winding as a variable resistance for controlling the said driving current; and means for controlling the effective resistance of said transistor with said reference voltage.

6. The D.C. voltage regulator claimed in claim 5 wherein the means for controlling the effective resistance of said transistor comprises a Zener diode coupling said D.C. reference voltage point to the base of said transistor.

7. A D.C. voltage regulator of the blocking oscillator type comprising a transistor coupled in series between a D.C. source and a load, said switch being periodically opened and closed in response to a load and D.C. source representative variable control current applied to the base thereof, a transformer having a primary winding coupled in series with the emitter-collector of the transistor switch and further having a first positive feedback control current supplying winding and a second feedback winding with both feedback windings magnetically coupled to the primary winding, a feedback circuit interconnecting the first and second feedback windings with the base of the transistor switch, said feedback circuit including a series-connected positive feedback current-controlling transistor device having a pair of power terminals coupling the first winding to the base of the transistor switch and a reference voltage-generating circuit driven by the second winding for generating a reference voltage which is coupled to the feedback current-controlling transistor device, said reference voltage having a magnitude representative of the load voltage and a polarity selected to apply a negative feedback effect on the control current.

References Cited

UNITED STATES PATENTS

| | | |
|---|---|---|
| 3,229,194 | 1/1966 | Mills. |
| 3,264,550 | 8/1966 | Paice _____ 323—16 X |
| 3,290,583 | 12/1966 | Sinclair. |
| 3,325,725 | 6/1967 | Nylander. |
| 3,328,674 | 6/1967 | Bleicher. |

JOHN F. COUCH, Primary Examiner

A. D. PELLINEN, Assistant Examiner

U.S. Cl. X.R.

323—38

UNITED STATES PATENT OFFICE
CERTIFICATE OF CORRECTION

Patent No. 3,461,377  August 12, 1969

John S. Reese

It is certified that error appears in the above identified patent and that said Letters Patent are hereby corrected as shown below:

Column 4, line 40, "linear" should read -- linearly varying
line 57, "means" should read -- element --.

Signed and sealed this 21st day of April 1970.

(SEAL)
Attest:

Edward M. Fletcher, Jr.
Attesting Officer

WILLIAM E. SCHUYLER, JR.
Commissioner of Patents